(12) United States Patent
Posner

(10) Patent No.: US 8,056,192 B1
(45) Date of Patent: Nov. 15, 2011

(54) HOSE CLAMP WITH PARALLEL TIGHTENING AND RAPID RELEASE

(76) Inventor: Samuel Lewis Posner, N. Miami, FL (US)

(*) Notice: Subject to any disclaimer, the term of this patent is extended or adjusted under 35 U.S.C. 154(b) by 0 days.

(21) Appl. No.: 12/804,932

(22) Filed: Aug. 2, 2010

Related U.S. Application Data

(60) Provisional application No. 61/336,336, filed on Jan. 21, 2010.

(51) Int. Cl.
 *B65D 63/00* (2006.01)
(52) U.S. Cl. ............... 24/272; 24/17 A; 24/271; 24/273; 24/20 TT; 24/16 PB
(58) Field of Classification Search .................. None
 See application file for complete search history.

(56) References Cited

U.S. PATENT DOCUMENTS

| | | | | |
|---|---|---|---|---|
| 1,874,731 A | * | 8/1932 | Younce | 29/222 |
| 4,008,512 A | * | 2/1977 | Prodel | 24/16 PB |
| 4,546,524 A | * | 10/1985 | Kreft | 24/274 R |
| 5,257,439 A | * | 11/1993 | LeBlanc | 24/269 |
| 5,661,876 A | * | 9/1997 | Goldenberg | 24/19 |
| 5,745,963 A | * | 5/1998 | Graziano | 24/68 SK |
| 5,839,170 A | * | 11/1998 | Cho | 24/163 R |
| 6,003,208 A | * | 12/1999 | Christian et al. | 24/16 PB |
| D438,442 S | * | 3/2001 | Osborne | D8/98 |
| 7,055,225 B1 | * | 6/2006 | Brant et al. | 24/269 |

* cited by examiner

*Primary Examiner* — Jack W. Lavinder
(74) *Attorney, Agent, or Firm* — Laurence A. Greenberg; Werner H. Stemer; Ralph E. Locher

(57) ABSTRACT

An improved clamp constricting objects to be held in place including hoses wires tubes. One embodiment having some or all plastic molded parts one of which is a support base (10) to one side is attached a partially grooved or fully flexible grooved band strap (13) where as the other end is free to enter a band strap entrance port (26) thereby contact is made with a matching grooved rotating cylinder (12) held by two bearings. The band strap (13) advances encircling objects to be held. The support base top (11) is closed and locked by the rapid release hold down top lock (20) confining the grooved molded rotating cylinder (12) engaging a flexible paw (17) allowing advancing rotation only, preventing the grooved molded band strap (13) from retracting. Six sided wrench or tool is inserted into the cylinder cavity (15) forcefully rotating the grooved rotating cylinder (12) advancing the flexible grooved band strap (13) through exit port (27) being held down by band strap retainers (18). A rapid release finger grip (19) releases a rapid release hold down top lock (20) lifting the molded support base top (11) disengaging the flexible paw (17) from the grooved molded rotating cylinder (12) allowing counter rotation of the grooved molded rotating cylinder (12) retracting the flexible grooved band strap (13) freeing the constricted objects.

11 Claims, 6 Drawing Sheets

Section A-A

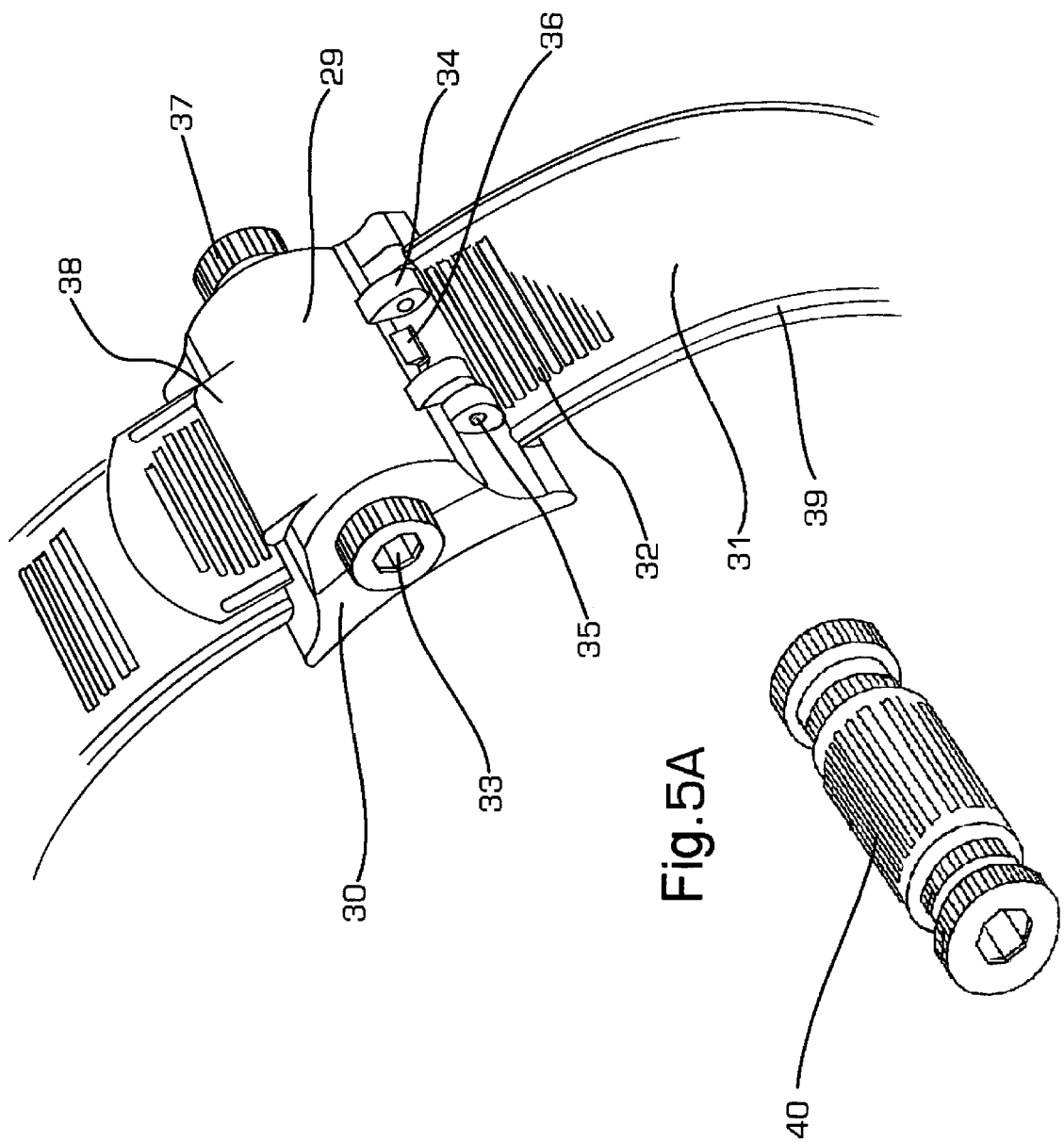

HOSE CLAMP WITH PARALLEL TIGHTENING AND RAPID RELEASE

CROSS-REFERENCE TO RELATED APPLICATIONS

This application claims the benefit of provisional patent application Ser. No. 61/336,336 filed 2010 Jan. 21 by the present inventor.

FEDERALLY SPONSORED RESEARCH

Not Applicable

SEQUENCE LISTING OR PROGRAM

Not Applicable

BACKGROUND

1. Field of Invention

This invention relates to clamps particularly hose clamps that are used to constrict hoses on fittings or other objects to be confined.

2. Prior Art

It is common practice to fasten a tube or hose to an end fitting or connector so the contents of the tube or hose may reach its destination or the final connection. The hose or tube must be securely attached to the fitting usually this is accomplished by compressing the tube or hose around the circumference of the fitting. These devices are known generally as hose clamps.

The present invention relates generally to hose clamping devices and particularly an improved hose clamp apparatus. Other general uses of this invention may apply to similar devices that are used to constrict items such as wires, a collection of small tubing or other items or objects needing confinement. Since the beginning use of hoses, hose clamps, a necessary apparatus, have come in a large variety of designs. None of which have completely satisfied the use advantages but have unfortunately incorporated many disadvantages in there overall design. Some of the problems have been addressed but not adequately and never completely in one clamp.

A frequent problem is hose clamps and hoses are positioned in confined spaces or visually out of sight so that only one hand may be used when, tightening or loosening a clamp. The preferred clamp used today is referred to as the "worm screw" type such as patented by Hill et al., U.S. Pat. No. 2,395,273 (1946), Black, U.S. Pat. No. 2,944,314 (1960), Rueckheim U.S. Pat. No. 3,371,392 (1966), E. E. Schaefer U.S. Pat. No. 2,767,455 (1956) H. P. McKown, Jr. U.S. Pat. No. 3,195,204 (1965), C. E. Hathorn U.S. Pat. No. 2,268,211 (1941), E. W. North et al U.S. Pat. No. 2,386,629 (1945), C. W. Tinsley U.S. Pat. No. 3,087,220 Patent (1963), Allert U.S. Pat. No. 4,445,254 (1984) and L. Baldo U.S. Pat. No. 2,522,494 (1950) these types of hose clamps are accessible primarily from an adjacent direction substantially tangential to the hose, when using a tool to tighten or loosen the clamp it is virtually impossible without the use of another hand to hold the clamp in place since they tend to rotate around the circumference of the hose, when loose. Unfortunately tight areas and hard to reach places are common when using hoses and fittings. This invention solves this critical problem and others as described below.

Other types of hose clamps have tried to address this critical problem but not in a complete manner such as Kreft, U.S. Pat. No. 4,546,524 (1985) with a metal "worm gear" type hose clamp. Kreft has positioned a tightening wrench opposed to the axial of the hose, however it appears that the hexagonal wrench can only be inserted on one side of the head limiting its practical use in hard to reach spaces. Also, the patent does not describe in detail the means of attachment of the locking and gear section to the band or strap, which is critical to its function and cost of manufacture. The strength of the teeth is also a factor due to their nominal width as well as the depth of engagement in the slots in the strap are also questionable. Difficulty appears when the engaging member tab, holding the gear in a stop position where as the hexagonal wrench must be withdrawn so the gear will slide into position by means of a spring. If the hexagonal wrench is removed, force cannot be maintained against the spring causing counter rotation of the gear releasing the strap. Small thin metal tabs are all that prevents the clamp from disengaging as well as a fine steel spring to engage the stop incidence of corrosion are common and will certainly cause this clamp to fail.

Younce, U.S. Pat. No. 1,874,731 (1932) also addresses longitudinal axis but is specifically designed as a "piston ring compressing tool" not a hose clamp. Kitts, U.S. Pat. No. 2,383,199 (1945) and Brodheim, U.S. Pat. No. 2,641,817 (1953) not in general use today for other apparent reasons as described below, they do employ a screw head oriented substantially parallel to the central longitudinal axis of the circular band for tightening. Brodheim, U.S. Pat. No. 2,641,817 (1953), Kitts U.S. Pat. No. 2,383,199 (1945) and W. C. Dumke U.S. Pat. No. 1,963,436 (1934) employ a separate paw and ratchet on an eccentric wedging member to lock the clamp apparatus also employed are metal straps or a flexible band around a winding element. All of which have exposed mechanisms that can become entangled with adjacent apparatus or cause injury by having exposed sharp edges. It also appears some difficulty would be encountered releasing the ratchets when under reverse force from the tightened strap. Kitts U.S. Pat. No. 2,383,199 (1945) as mentioned above this device may also be accidentally released by the exposed position of the ratchet paw. Another major flaw in all the above clamps is that the parts are all various types of metal costly to fabricate, manufacture and assemble. In a relatively short time, under certain conditions, all metal even high quality will corrode, fatigue and erode, especially made from thin sheet metal with no substantial thickness.

Many of these perforated strap clamps are used on soft flexible hose materials so as the band is tightened the soft hose material is pushed through the perforations in the band damaging the hose and with some designs pushing the "worm gear" away from the perforations in the strap ultimately disengaging the clamp. It has been demonstrated that "worm gear" design when over tightened will fracture or bend the metal between each perforation of the strap since they are close together with little metal support between each perforation. Little surface contact between the "worm gear" and the perforations also causes failure.

Another desirable feature of a hose clamp is to provide a quick or rapid disconnect. Toth, U.S. Pat. No. 5,063,642 (1991) attempts to address rapid disengagement of a "worm gear" type clamp. Although it appears that in order to release the gear from the slotted strap it would have to be pried up with a tool not easily accomplished in tight surroundings or areas out of sight. In addition all the clamps cited above are fabricated from metal, costly to fabricate, manufacture and assemble.

Other references cited are clamps primarily made of polymeric material such as LiVolsi, U.S. Pat. No. 4,483,556 (1984) this hose clamp which is injection molded is less expensive to produce and uncomplicated to manufacture. Made from polymeric material it will not corrode or degrade as metal clamps. Although it has no means to disengage and is designed to be finger tightened only limiting its use. Today most hose clamps used for low pressure applications are "worm gear" types. All hose clamps of this type as described above in various forms suffer from a number of disadvantages:

(a) Hose clamps based on the "worm gear" design principle cannot be applied or removed using only one hand. A distinct disadvantage in many applications.
 (b) All prior art hose clamps designed for medium pressure applications are fabricated from metal. Under certain adverse conditions such as exposure to acids, salts, electrolysis, flexing, vibrations and the like may degrade these clamps to the point of failure, even high quality stainless steel.
 (c) The majority of hose clamps used today do not embody means to rapidly and easily disengage.
 (d) The need to use tools to install or remove hose clamps such as slotted screwdrivers or ratchets in places inaccessible or completely out of view is cumbersome a distinct disadvantage.
 (e) Another disadvantage is the inability to color code in order to identify the contents being carried within a hose and could be a safety issue.
 (f) To assembly metal hose clamps you must consider the cost of material, overall energy necessary to manufacture and form parts, labor and assembly equipment, manufacturing space, shipping, as well as other peripheral expenses. These costs are exceedingly greater than a polymeric composite, injection molded, hose clamp.
 (g) Some hazards of using metal hose clamps are injuries and cuts from sharp edges and accidental electrical conductivity.

SUMMARY

In accordance with one embodiment a hose clamp by means of a grooved molded rotating cylinder in contact with a band strap of matching grooves as the loose end advances through a guided molded support base constricting a hose about a fitting or other objects to be confined.

DRAWINGS

Figures

A better understanding of the invention and its various features and advantages will be had by referring to the following detailed description taken in conjunction with the accompanying drawings in which:

FIG. 5A shows an additional isometric perspective embodiment.

DRAWINGS

Reference Numbers

Figure 1:
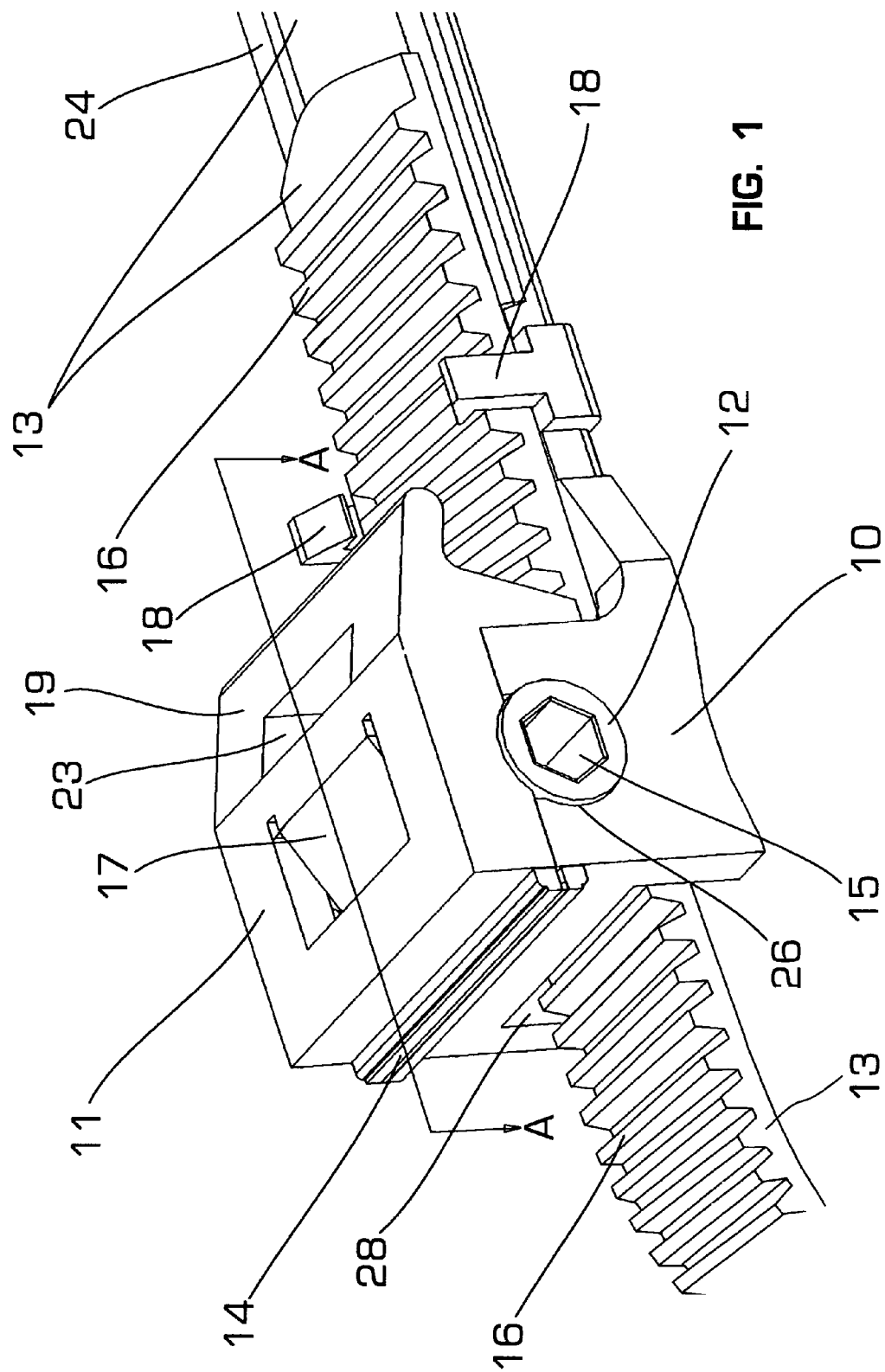
FIG. 1 shows an isometric perspective view of a preferred embodiment of the assembled clamp with band strap engaged.

| DRAWINGS Reference Numbers | |
|---|---|
| 10 | molded support base |
| 11 | molded support base top |
| 12 | grooved molded rotating cylinder |
| 13 | flexible grooved band strap |
| 14 | molded hinge |
| 15 | cylinder cavity |
| 16 | grooves in band strap |
| 17 | flexible paw |
| 18 | band strap retainers |
| 19 | rapid release finger grip |
| 20 | rapid release hold down top lock |
| 21 | hose |
| 22 | rapid release top lock lip |
| 23 | mold clearance holes |
| 24 | raised bevels |
| 25 | lock bar |
| 26 | grooved cylinder bearings |
| 27 | band strap exit port |
| 28 | band strap entrance port |
| Reference Numbers for Additional Embodiment | |
| 29 | support base top |
| 30 | support base |
| 31 | band strap |
| 32 | grooves |
| 33 | cylinder cavity |
| 34 | hinge ears |
| 35 | hinge pin |
| 36 | top open stop |
| 37 | finger tight knobs |
| 38 | quick release finger tab |
| 39 | raised bevels |
| 40 | rotating cylinder |

DETAILED DESCRIPTION

FIGS. 1 Through 5—Preferred Embodiment

The preferred embodiment of the hose clamp with parallel tightening and rapid release as illustrated in FIGS. 1 through 5 comprising the molded support base 10 including the molded support base top 11 which is attached to the molded support base 10 by a molded hinge 14 and a rapid release hold down top lock 20 as illustrated in FIGS. 2, 3, 4 and 5 a flexible paw 17 or an eccentric wedging member is molded in the top of the molded support base 11, the rapid release finger grip 19 the rapid release hold down top lock 20 the lock bar 25 shown in FIGS. 2, 3, 4 and 5 and two band strap retainers 18 shown in FIGS. 1, 2, 3, 4 and 5 which hold the flexible grooved band strap 13 also shown are the grooves 16 molded in the flexible grooved band strap 13, which enters the molded support base 11 by a band strap entrance port 28 and a band strap exit port 27 as shown in FIGS. 1, 2, 3, and 4 a grooved molded rotating cylinder 12 is held within the molded support base 10 by two grooved cylinder bearings 26 shown in FIGS. 1, 2, 3, and 4, a cylinder cavity 15 is centered within the grooved molded rotating cylinder 12 that accepts a six sided hexagonal wrench commonly known in industrial applications as an "Allen" wrench (not shown).

In this preferred embodiment all the parts are molded or formed from extruded or injected plastic heated to a liquid state such as Nylon or any other material or combinations of composites that make the clamp stronger more resilient longer lasting or any other materials that can be molded or injected into a die by various processes of molding or machining. Shown in FIGS. 1, 3, 4 and 5 are mold clearance holes 23 which facilitate the process of molding during the ejection phase of manufacturing. Also shown in FIGS. 1, 2, 3, 4 and 5 are raised bevels 24 that give the strap additional strength.

Due to the variety of uses of a band strap clamp such as constricting hoses around fittings, bundling of smaller hoses, electrical wires, or any other items that may need bundling typically the molded support base 10 is 25 mm wide and 19 mm long and 15.8 mm high the flexible grooved band strap 13 is 15.8 mm wide these dimensions may be smaller or larger depending on the size of the hose or the objects to be confined. The hose clamp with parallel tightening and rapid release may be produced in different sizes and lengths of the grooved molded band strap 13 which may or may not change the character of the elements as described above of the preferred embodiment.

Operation—Refer to FIGS. 1, 2, 3, 4 and 5

Figure 2:
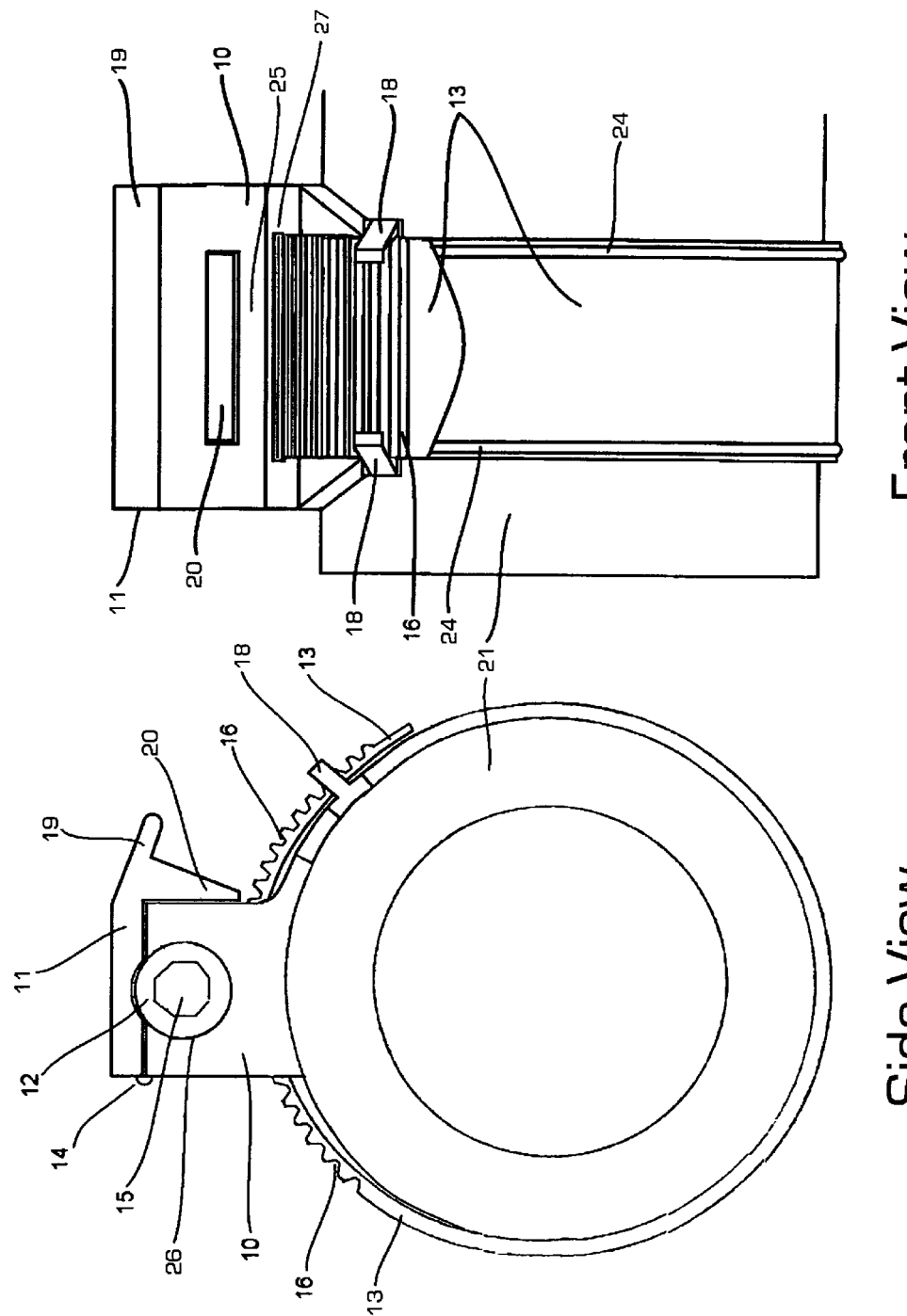
FIG. 2 shows a side and front plane view of the assembled preferred embodiment including the band strap engaged around a hose.
Figure 3:
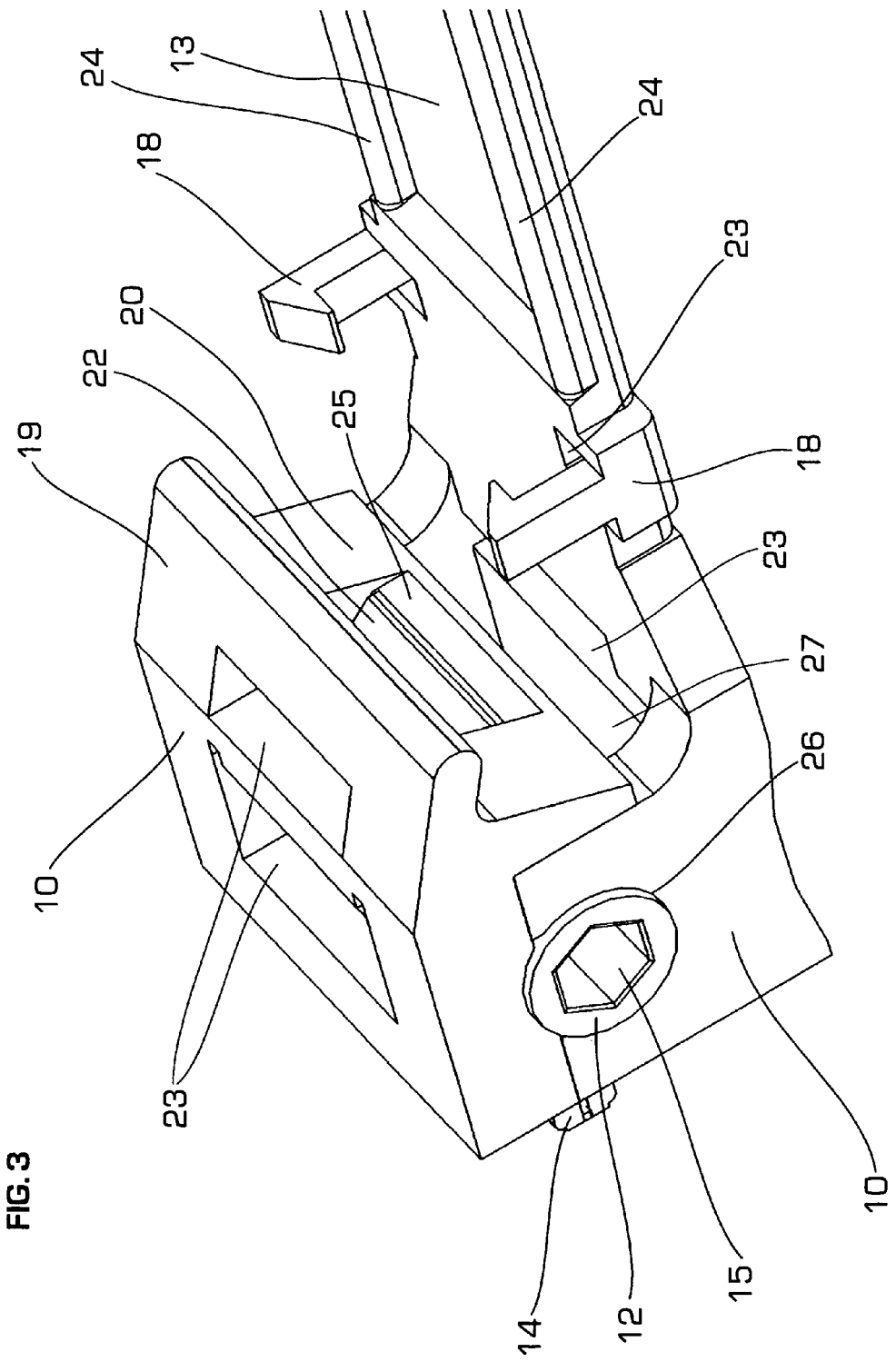
FIG. 3 shows another isometric perspective of the preferred embodiment with the band strap disengaged.
Figure 4:
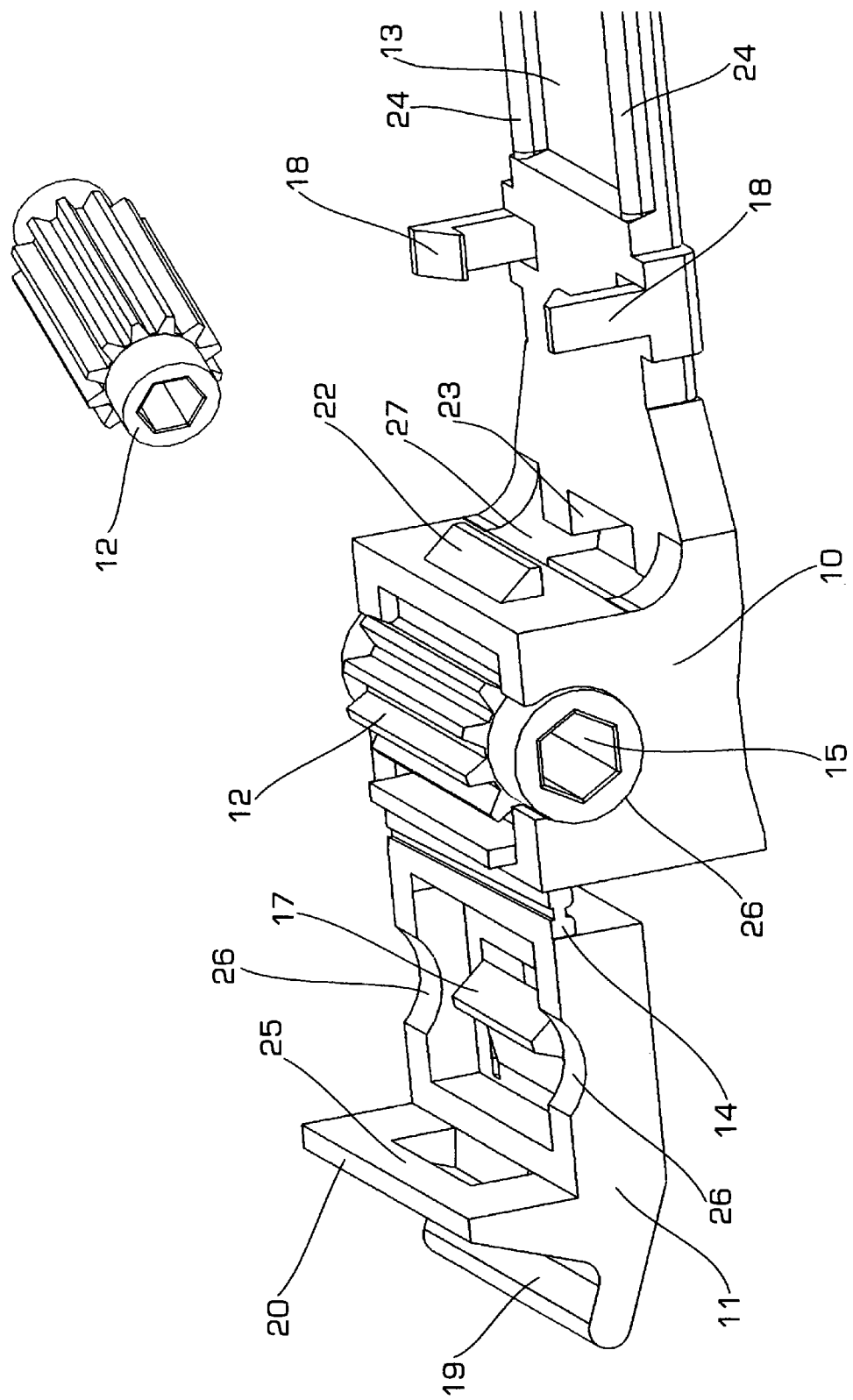
FIG. 4 shows an isometric perspective of the preferred embodiment with the molded support base top open without the band strap engaged.
Figure 5:
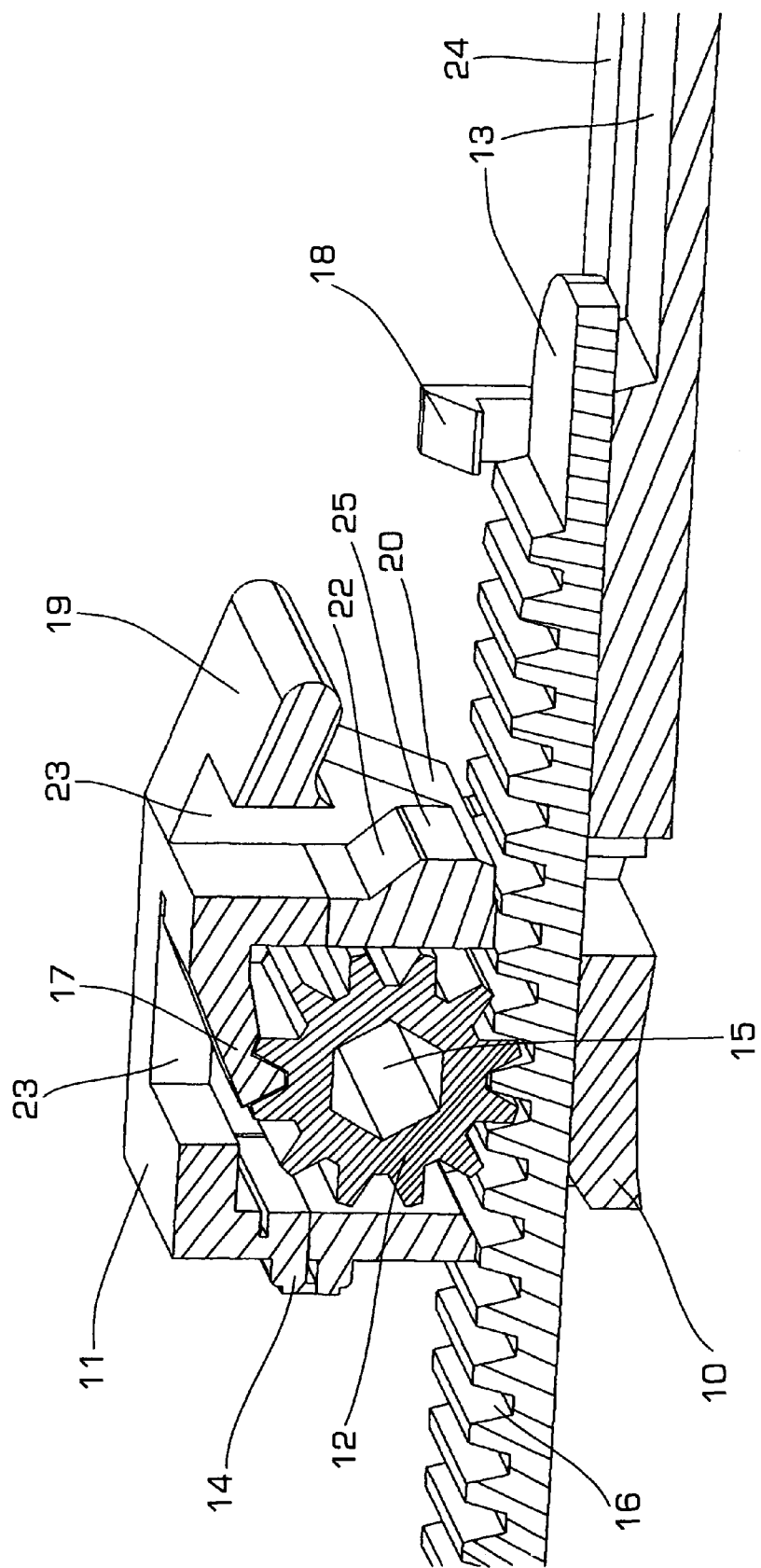
FIG. 5 shows an isometric perspective of the preferred embodiment sectioned "A-A" along the length of the band strap and support base as shown in FIG. 1

The hose clamp with parallel tightening and rapid release may be applied to a hose or other items that need bundling by simply wrapping around a hose or other items as mentioned above by inserting the end of the flexible grooved band strap 13 into the molded support base 10 band strap entrance port 28 as shown in FIG. 1 then advancing the flexible grooved band strap 13 while the molded support base top 11 is in the open position as shown in FIG. 4. The flexible grooved band strap 13 enters the molded support base 10 engaging the grooves 16 of the flexible grooved band strap 13 with the grooves of the grooved molded rotating cylinder 12 then freely rotate as it is supported by the molded support base 10 by means of two grooved cylinder bearings 26 as shown in FIGS. 1, 2, 3 and 4. As the flexible grooved band strap 13 advances through the support base 10 it will exit the band strap exit port 27 as shown in FIGS. 2, 3, and 4 of the support base 10 sliding between the band strap retainers 18 or may be pushed down between the band strap retainers 18 which are angled down allowing the band strap retainers 18 to spring out placing the flexible grooved band strap 13 under the band strap retainers 18 of which the free end of the flexible grooved band strap held in confined position over lapping the end of the flexible grooved band strap 13 which is attached to the molded support base 10 as shown in FIGS. 1, 2 and 5. These band strap retainers 18 confine the end of the flexible grooved band strap 13 preventing the end of the flexible grooved band strap 13 from interfering with other equipment or items in close proximity to the band clamp when installed.

After positioning the flexible grooved band strap 13 through the support base 10 as shown in FIG. 1 the top of support base 11 is rotated by means of the molded hinge 14 and is then forced down by closing and pushing down on the molded support base top 11 and is locked and held in a locked position by the rapid release hold down top lock 20 by means of the lock bar 25 being locked under the rapid release top lock lip 22 as shown in FIG. 3. A hexagonal wrench, commonly known in industrial applications as an "Allen" wrench, this conventional tool would be inserted into the hexagon hole 15 parallel to the hose 21 which runs through the entire length of the grooved cylinder 12 therefore the wrench could be inserted into either end of the grooved molded rotating cylinder 12. By rotating the grooved molded rotating cylinder 12 with the hexagonal wrench in a direction either clockwise or counter clockwise depending on which end of the hexagonal hole 15 the hexagonal wrench is inserted will then engage the grooves 16 of the band strap 13 and the matching grooves of the grooved molded rotating cylinder 12 advancing the flexible grooved band strap 13 reducing the circumference of the flexible grooved band strap 13 tightening around a hose 21 or other items to be held in place or constricted as shown in FIG. 2. As the grooved molded rotating cylinder 12 rotates and the flexible grooved band strap 12 is advanced through the support base 10 a flexible paw 17 which is molded into the top of the molded support base top 11 glides over the top of each groove due to the tip angle of the flexible paw 17 drops firmly, due to the flexing of the mold material and the over positioning of the flexible paw 17 in relation to the grooves of the grooved molded rotating cylinder 12, into each groove of the grooved molded rotating cylinder 12 preventing the counter rotation of the grooved molded rotating cylinder 12 by the force applied radically to the flexible paw 17 then transmitting the force to the molded support base top 11 which is secured in a lock down position. Therefore the flexible grooved band strap 13 will only advance in one direction reducing the circumference of the flexible grooved band strap 13 tightening around a hose 21 or other objects to be held in place or constricted. The molded support base top 11 is held in place by a molded hinge 14 on one side and a rapid release hold down top lock 20 on the other side. By placing a finger under the rapid release finger grip 19 and preying up the molded support base top 11 will release the lock bar 25 from under the rapid release hold down top lock lip 22 and the top of the molded support base 10 will swivel on the molded hinge 14 releasing the flexible paw 17 from the grooved molded rotating cylinder 12 allowing the counter rotation of the grooved molded rotating cylinder 12 allowing the flexible grooved band strap 13 to slid back in the confined area of the molded support base 10 thereby releasing the constriction around the hose 21 or other objects to be confined. So that it is understood the grooved molded rotating cylinder 12 is a separate part and has been removed from the molded support base 10 as shown in FIG. 4. The grooved molded cylinder 12 is held in place when forced, during assembly, between the open sides of the grooved cylinder bearings 26 as shown in FIGS. 1, 2, 3, and 4. The opening is smaller then the diameter of the grooved molded rotating cylinder 12 bearing surfaces therefore once forced down into the grooved cylinder bearings 26 as shown in FIGS. 1, 2, 3, and 4 the grooved cylinder will stay in place.

FIG. 5A Illustrates an additional Embodiment

In FIG. 5A with band strap 31 engaged with the support base 30 and the support base top 29 closed illustrates the grooves 32 of the band strap 31 not extended fully to full width of the band strap 31 and extend the entire length of the band strap 31 whereas the raised bevels 39 extend on the outside of the band strap 31 the full length. The finger tight knobs 37 provide the ability to advance the band strap 31 tightening it around the circumference of a hose finger tight before applying a tightening tool that would be inserted in the cylinder cavity 33. The hinge ears 34 and the hinge pin 35 secure the support base top 29 to the support base 30 and will rotate to open the support base top 29 from the support base 30 releasing the constricting band strap 31 is accomplished by pushing up on the quick release finger tab 38 disengaging the top lock as described above in FIGS. 2, 3, 4 and 5. The top open stop 36 prevents the support base top 29 from opening totally so the rotating cylinder 40, shown removed from support base 30, on FIG. 5A is maintained within the support base 30.

ADVANTAGES

From the description above, a number of advantages of the preferred embodiment of my hose clamp with parallel tightening and rapid release become evident:

(a) As a mold there are several advantages to this embodiment. There are a vast variety of plastic compounds that can be injected into a mold to produce this embodiment. The plastic material from which this embodiment can be produced may vary according to the application and conditions for which this clamp may be applied.
(b) The plastic material from which this embodiment will be made will not corrode or rust and may be used within corrosive environments.
(c) The plastic material may be mixed with pigments producing colors to identify clamps for location or contents within hoses or groups of items as well as branded or screened for identification.
(d) Low cost of material and ease of manufacturing is another advantage when using molded parts compared to metal.
(e) This embodiment allows for the application to be accomplished with the use of only one hand because of the parallel position with regard to the hose or items being secured. The tightening of the clamp with a tool such as the hexagonal wrench once inserted within either side of the clamp will help to secure the clamp in a position where tightening can be accomplished without the clamp rotating around the hose or items to be constricted.
(f) A rapid release is provided that can also be accomplished with the use of only one hand. An important advantage in order to save time and under emergency conditions.
(g) This preferred embodiment is wider than most being used today. This extra width provides a better seal when clamping hoses, no need to use two clamps as is common when using a narrower metal clamp.
(h) This preferred embodiment can also be applied to a hose or other items to be clamped with speed and ease due to the support base top unlocks from the support base allowing the band strap to rotate the grooved cylinder freely as it enters the support base and slides over the attached end of the band strap. This can also be accomplished with one hand.
(i) This preferred embodiment can be tightened by inserting the hexagonal wrench into either end of the grooved cylinder for convenient application.

CONCLUSION, RAMIFICATIONS, AND SCOPE

Accordingly, the reader will see that the preferred embodiment of the hose clamp with parallel tightening and rapid release when applied to a hose or other objects to be constricted can easily be tightened and released using only one hand. As a molded device a variety of future or state of the art plastic compounds can be used providing strength to which will rival many clamps in use produced from steel as well as withstanding corrosive and fatigue.

An enclosed box design of the support base adds structure integrity to the cylinder bearing support. The top of the support base is shaped structurally to eliminate deflection from the upward force of the bearings, a locking device holding the top securely on one side and a full length molded hinge on the other side keeping the molded support base top firmly closed. All the structural shapes may be different as shown in FIG. 5A such as curved, thicker, more angular with greater or less strength. The top of the base support may be locked down by several other means such as a hinged lock, a dow insertion or pin insertion. The use of a "living hinge" or molded hinge as proposed in the preferred embodiment can be molded in one complete operation no assembly required attaching the top to the support base also to the full width of one side of the base. Many other means of hinging could be proposed one of which is shown in FIG. 5A The cascading mechanical advantages of this invention will become apparent starting with the leverage obtained from the hexagonal ninety-degree "Allen" wrench used as a tightening tool. The capability to insert the full length of the short end of this tool with complete contact of six flat surfaces, dimensionally snug, within the interior cavity of the rotating cylinder has a distinct mechanical advantage. In order to gain sufficient compression when tightening a flexible band strap it is essential to use a tool such as the hexagonal wrench as demonstrated in almost every prior art hose clamp. Another advantage using the hexagonal wrench is when applying a hose clamp with one hand or the clamp may be out of sight you may release your hold on the tool without it losing contact with the clamp since it is snuggly held in place within the rotating cylinder. The rotating cylinder makes an easy target when using an evenly spaced six-sided wrench since it can be inserted at almost any circular angle. Many different types of tools may and have been used such as screwdrivers, sockets with ratchet wrenches, other drivers with a variety of shaped tips.

While my above description contains much specificity, they should not be construed as limitations on the scope of the invention, but rather as an exemplification of one preferred embodiment thereof. Many other variations are possible, for example:

a. The width, length, size and shape of the support base may vary.
b. The band strap width, length, size, thickness and the attachment or non-attachment to the support base may vary.
c. The grooves on the band strap and rotating cylinder maybe teeth or gears of varying sizes in width, depth, pitch spacing and design. Extending the entire length of the band strap as shown in FIG. 5A.
d. The tools used to advance the band strap by rotating the cylinder may be a screwdriver of different tip shapes, a ratchet with sockets or a special designed tool specific to a particular adapter.
e. The hinged support base top may vary in design such as a slide or hook or as shown in FIG. 5A although this design may require additional assembly and parts.
f. The support base top may be locked down with a snap lock using an additional hinge a dow and hole side clips attached to the base all of which may require tools to release or may be difficult to perform with one hand.
g. The paw may vary in size shape width increase or decrease in flexibility and hold the rotating cylinder from a different angle.
h. The preferred embodiment is molded from liquefied plastic for the purpose of incorporating the design possibilities as described. The plastic material is a function of the design in order to withstand the conditions to which hose clamps are exposed and the reduced cost to manufacture. The plastic material maybe various compounds with additives designed for specific applications in a variety of different colors. Parts of this hose clamp may be produced from metal in total embedded or tipped in specific areas, machined, die cast, forged, or pressed.
i. The rotating cylinder can be metal molded compressed formed or produced by other means. A ratchet can be incorporated within an outer and inner sleeve allowing rotation in one direction only and slipping in a counter rotation.
j. The band strap may be as a molded permanently attached to the support base or attached by mechanical means to allow for interchangeable lengths or sizes.

k. The band strap retainers molded into the strap allowing the band strap to slide under or pressed under the retainers holding the band strap close to the attached end of the band strap so it will not interfere with objects in the area of the hose clamp. This retainer may be a strap or loop around the band strap where by the end or loose portion of the band strap may slip under the loop retaining the loose end of the band strap.

Thus the scope of the embodiment should be determined by the appended claims and their legal equivalents, rather than by the examples given.

I claim:

1. An improved clamp apparatus for alternatively tightening and clamping, or loosening and releasing an object or objects to be confined, the apparatus comprising:
 a support base formed of plastic material;
 an elongated flexible band strap formed of the plastic material with grooves or teeth on an outer surface thereof attached at one end to said support base and having a tail portion insertible into and through said support base at another end, said support base engaging and retaining said flexible band strap when said tail portion of said flexible band strap is inserted through said support base, wherein said flexible band strap is guided through said support base, formed into a loop and secured in a finger tight constricted position within said support base;
 a grooved or toothed cylinder pinion gear positioned within said support base with grooves or teeth around a circumference matching grooves or teeth on the outer surface of said flexible band strap engaging and meshing with said flexible band strap;
 said grooved cylinder pinion gear being formed with a structure enabling a tool head to engage in a form-fitting manner, to allow the tool to rotate said pinion gear about an axis substantially parallel to a longitudinal axis of the object or objects to be clamped and to index said flexible band forward in a loop-constricting direction, and
 a paw disposed to lock said pinion gear against a rotation allowing said flexible band to index backwards in a loop-releasing direction while allowing said pinion gear to be rotated for indexing said flexible band forward in the loop-constricting direction, and
 wherein said flexible band strap is advanced through said, support base reducing the diameter of said flexible band strap and resulting loop confining such as a hose from about an internally positioned collar or encircling a bundle of wires or tubes to be clamped or any other objects to be held in a confined position, said flexible band strap is held in a confined loop by means of a flexibly mounted levered paw acting as a ratchet upon said rotating grooved cylinder pinion gear rotation of said grooved cylinder pinion gear is accomplished by inserting an angled or straight flat sided lever or tool driven wrench into a matching flat sided cavity centered within the grooved cylinder pinion gear, manually swinging or rotating lever wrench into an operative position secure within the grooved cylinder pinion gear cavity; a locked down support base top spring loads a flexibly mounted levered paw with a paw tongue positioned at the extreme end of said flexibly mounted levered paw forcibly inserts tongue between each groove or tooth of said grooved cylinder pinion gear ramped side of paw tongue allows flexible levered paw to flex upward sliding over each tooth of said grooved cylinder pinion gear disengaging paw tongue from between the teeth of said grooved cylinder pinion gear allowing rotation of said grooved cylinder pinion gear, sliding said flexible band strap in a ever increasing constricting direction; preventing counter rotation of said rotating grooved cylinder pinion gear by means of said engaged paw tongue between each tooth having a flat side opposite ramped side of said paw tongue in parallel with the flat side of each grooved cylinder pinion gear groove or tooth, locking each groove or tooth against the flat side of paw tongue.

2. The clamp apparatus according to claim 1, configured to clamp a hose onto an internally positioned collar or encircling a bundle of wires or tubes to be clamped.

3. The clamp apparatus according to claim 1, wherein said flexible band strap is an elongated variable length flexible band strap.

4. The clamp apparatus according to claim 1, wherein said grooved cylinder pinion gear is formed with a flat sided cavity allowing a ninety degree angled flat sided lever wrench to be inserted therein, such that a pivoting or rotating a lever of said flat side lever wrench in a direction substantially parallel to said elastic band strap rotates said pinion gear and advances the strap in a forward, and loop-constricting direction.

5. The clamp apparatus according to claim 4, wherein said cavity is a hexagonal void extending through a center of said pinion gear in a direction substantially parallel to a longitudinal axis of the object to be clamped.

6. An improved clamp apparatus for alternatively tightening and clamping, or loosening and releasing an object or objects to be confined, the apparatus comprising:
 a support base formed of plastic material;
 an elongated flexible band strap formed of the plastic material with grooves or teeth on an outer surface thereof attached at one end to said support base and having a tail portion insertible into and through said support base at another end, said support base engaging and retaining said flexible band strap when said tail portion of said flexible band strap is inserted through said support base, wherein said flexible band strap is guided through said support base, formed into a loop and secured in a finger tight constricted position within said support base;
 a grooved or toothed cylinder pinion gear positioned within said support base with grooves or teeth around a circumference matching grooves or teeth on the outer surface of said flexible band strap engaging and meshing with said flexible band strap;
 said grooved cylinder pinion gear being formed with a structure enabling a tool head to engage in a form-fitting manner, to allow the tool to rotate said pinion gear about an axis substantially parallel to a longitudinal axis of the object or objects to be clamped and to index said flexible band forward in a loop-constricting direction, and
 a paw disposed to lock said pinion gear against a rotation allowing said flexible band to index backwards in a loop-releasing direction while allowing said pinion gear to be rotated for indexing said flexible band forward in the loop-constricting direction; and
 wherein a mechanism to rapidly release said flexible band strap from a constricted position; urging a finger grip protruding from support base top causing hold down top lock to release from support, base lifting said support base top lifting said flexible levered paw attached to said support base top resultant disengagement of paw tongue from grooves or teeth of said grooved cylinder pinion gear wherein said flexible band strap slides freely in the opposite direction from a constricted position releasing objects clamped.

7. An improved clamp apparatus for alternatively tightening and clamping, or loosening and releasing an object or objects to be confined, the apparatus comprising:
- a support base formed of plastic material;
- an elongated flexible band strap formed of the plastic material with grooves or teeth on an outer surface thereof attached at one end to said support base and having a tail portion insertible into and through said support base at another end, said support base engaging and retaining said flexible band strap when said tail portion of said flexible band strap is inserted through said support base, wherein said flexible band strap is guided through said support base, formed into a loop and secured in a finger tight constricted position within said support base;
- a grooved or toothed cylinder pinion gear positioned within said support base with grooves or teeth around a circumference matching grooves or teeth on the outer surface of said flexible band strap engaging and meshing with said flexible band strap;
- said grooved cylinder pinion gear being formed with a structure enabling a tool head to engage in a form-fitting manner, to allow the tool to rotate said pinion gear about an axis substantially parallel to a longitudinal axis of the object or objects to be clamped and to index said flexible band forward in a loop-constricting direction; and
- a paw disposed to lock said pinion gear against a rotation allowing said flexible band to index backwards in a loop-releasing direction while allowing said pinion gear to be rotated for indexing said flexible band forward in the loop-constricting direction; and
- wherein a mechanism to rapidly release said flexible band strap from a constricted position by means of urging upward a finger grip protruding from support base top causing hold down top lock to release from support base said support base top lifts by means of a flexible hinge attached to said support base top and said support base positioned opposite said hold down top lock.

8. A clamp apparatus, comprising:
- a grooved flexible band strap formed of a plastic material, said band strap defining a longitudinal direction and having a free end;
- a molded support base of plastic material contiguously and rigidly connected to said band strap at an end thereof opposite said free end, said molded support base having walls and openings formed therein through which said free end of said band strap is insertable and said band strap is movable in the longitudinal direction;
- a grooved cylinder pinion gear rotatably supported in said support base about an axis transversely to the longitudinal direction and having grooves or teeth extending transversely to the longitudinal direction and meshing with grooves or teeth formed on said molded band strap when said free end of said band strap is inserted in said support base;
- wherein a rotation of said pinion gear forces said flexible band in a forward direction to shorten a loop formed thereby and decrease a diameter thereof, or in an opposite direction to lengthen the loop and to increase a diameter thereof;
- a support base top configured to be placed onto and locked to said support base, said support base including a paw structure configured to engage in said grooves or teeth of said pinion gear to thereby lock said band strap against movement out of said support base while allowing a forward movement of said band strap caused by a rotation of said pinion gear, wherein said support base top is connected to said support base via a hinge, wherein said support base top is closed onto said support base by pivoting said support base top about said hinge and snapping said support base top into a locking relationship with said support base.

9. The clamp apparatus according to claim 8, wherein pinion gear is formed for engagement by a tool to force a rotation thereof causing said band strap to index in the forward direction.

10. The clamp apparatus according to claim 9, wherein pinion gear is formed with a central hexagonal opening extending axially therethrough, enabling a hexagonal head tool to engage with and rotate said pinion to force said band strap in the forward direction.

11. The clamp apparatus according to claim 8, wherein said support base top is integrally formed and molded with said support base and said hinge is a molded living hinge pivotally connecting said support base top to said support base.

* * * * *